United States Patent [19]

Deneke et al.

[11] 4,268,485
[45] May 19, 1981

[54] PROCESS FOR THE SEPARATION OF RADIOACTIVE IMPURITIES OF BADDELEYITE

[75] Inventors: Klaus Deneke, Troisdorf; Arnold Lenz, Cologne, both of Fed. Rep. of Germany

[73] Assignee: Dynamit Nobel Aktiengesellschaft, Troisdorf, Fed. Rep. of Germany

[21] Appl. No.: 747,137

[22] Filed: Dec. 3, 1976

[30] Foreign Application Priority Data

Dec. 5, 1975 [DE] Fed. Rep. of Germany ....... 2554651

[51] Int. Cl.$^2$ .................... C01G 43/00; C01G 25/02; C01G 27/02
[52] U.S. Cl. .......................... 423/3; 423/80; 423/84
[58] Field of Search ............................ 423/3, 80, 84, 2

[56] References Cited

U.S. PATENT DOCUMENTS

| | | | |
|---|---|---|---|
| 2,875,107 | 2/1959 | Daiger | 423/80 |
| 2,974,014 | 3/1961 | Hoekje et al. | 423/3 |
| 3,413,082 | 11/1968 | Owens | 423/84 |
| 3,856,512 | 12/1974 | Palmer et al. | 423/84 |
| 4,067,953 | 1/1978 | Roux et al. | 423/20 |

FOREIGN PATENT DOCUMENTS 2051299 9/1972 Fed. Rep. of Germany.

*Primary Examiner*—Edward A. Miller
*Attorney, Agent, or Firm*—Sprung, Felfe, Horn, Lynch & Kramer

[57] ABSTRACT

A process for separating radioactive impurities from baddeleyite to obtain zirconium dioxide containing only traces of radioactive impurities, comprising grinding the baddeleyite preferably to a particle size of a maximum of 2% greater than 0.06 mm and then treating it directly with a 10 to 60% by weight aqueous alkali hydroxide solution at elevated temperatures below the boiling point of said solution at temperatures of 80° to 140° C. for 2 to 15 hours or until the desired degree of purity of the zirconium dioxide is obtained. In a preferred embodiment, sodium hydroxide is utilized and the ground baddeleyite preliminarily has been purified to the content of greater than 98% (zirconium dioxide+hafnium dioxide) by known methods.

10 Claims, No Drawings

PROCESS FOR THE SEPARATION OF RADIOACTIVE IMPURITIES OF BADDELEYITE

CROSS-REFERENCE TO RELATED DIVISIONAL APPLICATION

Reference is made to application Ser. No. 102,596, filed Dec. 12, 1979, which is a division hereof.

The object of the invention is a process for the separation of radioactive impurities in ground baddeleyite, which is characterized in that finely ground baddeleyite is treated with aqueous alkali-hydroxide solution at elevated temperature, preferably at temperatures up to below the boiling point of the alkali-hydroxide solutions, until the desired degree of purity is attained, with subsequent isolation of the zirconium dioxide. Alternatively, the baddeleyite is recrystallized from a melt of flint glass in a known manner.

Zirconium dioxide is acquiring increasing importance in ceramic applications. For example, in the synthesis of ceramic coloring substances based on zirconium with the use of certain chromophoric ions such as iron, vanadium and praseodymium, a $ZrO_2$ as pure as possible is preferably used.

By reason of zirconium dioxide's high melting point and its great resistance to metallic and slag fusion, it has also found many-faceted application in oxide ceramics and in the area of high-heat-resistant refractory.

Special requirements are to be set for the raw material of zirconium dioxide with reference to its radioactive harmlessness. In the course of ceramic processing methods, as well as in use of the finished molded members, for example wall plates with a zirconium-dioxide-based ceramic color, radioactive emissions must be avoided.

The radioactivity of certain zirconium dioxides comes from impurities due to $U_3O_8$ and $ThO_2$ and thus from the isotopes U-238 and Th-232 and their fission products. Such zirconium dioxide is prepared from natural baddeleyite.

Baddeleyites, especially those of South African origin, have recently acquired increasing importance in relation to the other essential raw material zircon (zirconium silicate) which is found primarily in Australia.

Zirconium dioxides from the raw material zircon, with an intensity of radiation (in this case always the sum of the alpha and beta radiation) of 20 to 30 pCi/g, are considered unobjectionable.

In contrast, zirconium dioxides from baddeleyite, which is associated with pitchblende, after mechanical separation of the pitchblende, show very high radiation intensities, for example, 3000–5000 pCi/g.

By treatment of the mechanically pre-purified baddeleyite with chemical methods, for example by acid treatment or partial chlorination (German Public Disclosure No. 1,934,660) a part of the accompanying impurities can be successfully separated, and a baddeleyite concentrate containing more than 98% by weight ($ZrO_2+HfO_2$) obtained from the crude baddeleyite. This known process however will not successfully produce a baddeleyite concentrate of more than 98% by weight ($ZrO_2+HfO_2$) which will at the same time also contain an unobjectionable percentage of radioactive impurities. Baddeleyite concentrates of this kind still contain radioactive impurities in a quantity exhibiting radiation intensities of 2000 to about 3200 pCi/g. (Cf. initial products of German Public Disclosure No. 2,416,755 and German Public Disclosure No. 2,051,299).

The processes described in these published sources have as their object the separation of radioactive impurities from zirconium dioxide obtained by the acid treatment of baddeleyite or by the partial chlorination of baddeleyite.

In these processes more than 99% by weight ($ZrO_2+HfO_2$) is obtained from the baddeleyite concentrate by a process of chemical absorption with zirconium-dioxide hydrate, with, and without, the addition of phosphate, a zirconium dioxide with a reduced radiation intensity of for example 730 pCi/g or 1800 pCi/g or 510 pCi/g. These intensities of radiation, however, are still too high for further processing or use.

The object of the present invention is to achieve a process whereby it is possible to obtain zirconium dioxide having an unobjectionable total radiation intensity.

This object is achieved by treating baddeleyite, preferably a baddeleyite concentration having a ($ZrO_2+HfO_2$) content greater than 98% by weight and finely ground, (a) directly with an aqueous alkali solution, or (b) recrystallizing baddeleyite from a melt of flint glass, wherein the flint glass absorbs the impurities and is subsubsequently separated from the melt by known processes, such as for example by flotation (German Pat. No. 1,118,178) or by some other suitable process, preferably by treatment with aqueous alkali solution, at elevated temperatures.

In accomplishment of the objects of the invention, both variants of said process start with a baddeleyite concentrate consisting more than 98% by weight of ($ZrO_2+HfO_2$).

Such a baddeleyite concentrate is obtained, for example, by known purification processes such as those described in German Public Disclosure No. 1,934,660.

The process of the present invention makes it possible to obtain a zirconium dioxide of rather high purity (in relation to disturbing elements such as aluminum, iron, titanium and the like) which at the same time exhibits an unobjectionable total radiation intensity of $<300$ to $<10$ pCi/g.

Particularly good results are obtained when a baddeleyite, with a content of $\geq 95\%$ by weight $ZrO_2+HfO_2$ for example, preferably a preliminarily purified baddeleyite (baddeleyite concentrate) with $>98\%$ by weight ($ZrO_2+HfO_2$), is used and subjected to recrystallization from a melt of flint glass.

The zirconium dioxide may be separated from the flint glass by example by flotation, as described in German Pat. No. 1,118,178. A zirconium dioxide with an especially low intensity of radiation is obtained when the separation of the flint glass is carried out in a fashion such that the finely ground melting stock (preferably having particle sizes with a maximum of 2% $>0.06$ mm) is suspended in 10 to 60 percent by weight, preferably 20 to 50 percent by weight, of aqueous alkali solution and this suspension agitated at temperatures of between 80° and 140° C. until the flint glass contained in the mixture is practically completely dissolved. The zirconium dioxide remaining behind, after being allowed to settle, is separated by decanting. It is then freed of any alkali-silicate solutions still adhering, advantageously by washing with hot aqueous alkali. The washing process may, if necessary, be repeated several times. After subsequent washing with water and preferably diluted acid, preferably hydrochloric acid and, if necessary also hydrofluoric acid, to neutralization, decanting and drying, the $ZrO_2$ obtained in a rather high yield exhibits a $SiO_2$-content of <0.5% by weight, and its total radiation intensity has dropped from originally about 500 pCi/g to <10 pCi/g.

In the variant of the process pursuant to the invention, recrystallization of the baddeleyite from a flint glass melt, there may, in principle, also be used as starting material a baddeleyite in which the concentration of $(ZrO_2+HfO_2)$ is <98% by weight, for example 95% by weight. This has the advantage that the preliminary purification by chemical methods according to the origin of the baddeleyite may either be omitted entirely or at least need not be performed in so costly a manner as in the processes hitherto known.

In recrystallization from the flint glass melt, simultaneously with the radioactive impurities, undesirable admixtures of other disturbing minerals or elements are also extensively separated. A further advantage is that the baddeleyite to be recrystallized granular may be used without further fine grinding.

For recrystallization of the baddeleyite or the baddeleyite concentrate quartz preferably is used as solvent. Recrystallization from the flint glass melt is generally carried out in a concentration range of 40 to 85% by weight $(ZrO_2+HfO_2)$, preferably of 60 to 75% by weight.

The synthetic mixtures of baddeleyite with for example quartz sand are melted down to a homogeneous melt and cooled. It is advantageous to cool the melt down slowly when separation of the flint glass is conducted by, for example, flotation (German Public Disclosure No. 1,118,178). Before flotation, the cooled melted stock is ground to the fineness of the $ZrO_2$-crystals solidified in the fused mass. (Screenings max. 2% >0.06 mm). When separation of the flint glass is to be conducted by means of concentrated aqueous alkali hydroxide, rapid cooling of the melting stock alternatively may be provided.

In general, the melting stock, both for flotation and for aftertreatment by means of concentrated aqueous alkali hydroxide, is ground to particle sizes corresponding to screenings of max. 2% >0.06 mm.

For further reduction of the $SiO_2$-content, the stock for example, floated pursuant to German Pat. No. 1,118,178, may be treated with dilute aqueous hydrofluoric acid. (5 to 10% by weight of hydrofluoric acid at ambient temperature).

For the separation of radioactive impurities, in a variant of the process pursuant to the invention, recrystallization may be omitted and baddeleyite concentrate, preferably pre-purified and containing more than 98% by weight $(ZrO_2+HfO_2)$, treated with alkali hydroxide solution at an elevated temperature, preferably at a temperature below the boiling points of the alkali-hydroxide solution, with agitation until the desired degree of separation of radioactive impurities has been attained.

The baddeleyite concentrate to be treated previously has been comminuted to particle sizes of a maximum of 2% >0.06 mm.

Treatment is advantageously carried out with 10 to 60 percent by weight, preferably 20 to 50% by weight of alkali-hydroxide solutions, preferably sodium hydroxide solutions, at a temperature range of from 80° to 140° C. at standard pressure.

In general, the duration of treatment, according to the percentage of radioactive impurities in the baddeleyite concentrate and according to the desired degree of purity, ranges from 2 to 15 hours.

The zirconium dioxide, after being allowed to settle, is separated from the aqueous caustic soda solution preferably by decanting and subsequently washed neutral. Preferably dilute aqueous acid solutions, in particular dilute hydrochloric acid solutions, are used. After washing the $ZrO_2$ is decanted anew and dried.

The obtention of zirconium dioxide by thermal decomposition of zircon (zirconium silicate) is known. On cooling, crystals of zirconium dioxide, embedded in a matrix of $SiO_2$, are deposited in the homogeneous fused mass. It is further known that the separated crystals of $ZrO_2$, relative to the impurities of the zircon used, undergo a certain purification with regard to the sesquioxides ($Fe_2O_3$, $Al_2O_3$), while the $TiO_2$-value is only immaterially reduced. This is probably accounted for by reasons of the chemistry of crystals (fairly great isomorphous inclusion of $TiO_2$ corresponding to ion size and formula type).

Surprisingly, it is found that in the recrystallization pursuant to the invention of the zirconium dioxide of baddeleyite from a melt of $SiO_2$, the $ZrO_2$-crystals obtained from the melt undergo a considerable purification in relation to the impurities of $U_3O_8$ and $ThO_2$ loaded by radioactive isotopes.

This finding was not foreseeable, since, particularly for $ThO_2$, the same considerations of crystal chemistry as stated above should have applied.

Since hafnium, in regard to its physical properties and its chemical state, does not differ, practically speaking, from zirconium, a separation of the two elements is, on the one hand, very difficult, but on the other, also superfluous. Therefore, wherever in the description and examples of the present application mention is made of $ZrO_2$ in connection with the process pursuant to the invention, the sum of $ZrO_2$ and $HfO_2$ is always meant. The same thing applies to the phrase "% by weight $(ZrO_2+HfO_2)$."

The process pursuant to the invention is explained in greater detail by the following examples.

The baddeleyite concentrate used has a radiation intensity of 490 pCi/g and corresponds to the following chemical composition (% by weight):

$SiO_2$:0.30
$TiO_2$:0.40
$Fe_2O_3$:0.18
$Al_2O_3$:0.10
CaO:0.065
MgO:0.058
$(ZrO_2+HfO_2)$>98

Radioactivity was measured with a Ge(Li)-detector in testing times of between 5 and 10 hours. For evaluation 3 lines each of the uranium-238 or thorium-232 disintegration series were used. In each instance the total activity is specified.

EXAMPLE 1

1 kg of baddeleyite concentrate of the above composition, containing >98% $(ZrO_2+HfO_2)$ with particle sizes of a maximum of 2% >0.4 mm, is ground to particle sizes of a maximum of 2% >0.06 mm and treated for 5 hours at about 120° C. with one liter of 40% aqueous NaOH solution. After being allowed to settle and being decanted the zirconium dioxide is washed neutral with water and then with dilute aqueous hydrochloric acid and is subsequently dried.

The original total radiation intensity was reduced from 490 to 270 pCi/g. The resulting zirconium dioxide corresponded in its chemical composition (excepting radioactive impurities) to the baddeleyite concentrate used.

EXAMPLE 2

Baddeleyite concentrate as in Example 1 is mixed without further preliminary grinding with 30% by weight of quartz sand and melted down homogeneously in the electric-arc furnace. The cooled melt is prepared by crushing and grinding to a particle size of a maximum of 2% >0.06 mm.

250 kg of the ground stock are suspended in 600 liters of deionized water, in which 800 g of lauric acid have been dissolved with heating to 60° C., and floated for 2 hours on a 12-cell flotation unit. 148 kg of zirconium dioxide, corresponding to about 85% of the theory of the resultant chemical compound, were obtained. The initial radiation intensity of the zirconium dioxide in the baddeleyite concentrate fell from 490 to 20 pCi/g.

EXAMPLE 3

75 kg of the ground melt stock of Example 2 were intensively treated with 100 liters of 42% aqueous NaOH from the counter-current wash steps at 120°–130° C. for about 8 hours, with agitation. The flint glass contained in the mixture was thereby virtually completely dissolved and the zirconium dioxide remaining behind was isolated by decanting. It was then freed, by washing, from adhering decomposition solution, in a two-step process with 100 liters of fresh hot (80° C.) 42% aqueous NaOH. The twice-used washing liquor serves for the fresh mixture. This is then washed neutral with water and dilute hydrochloric acid, by decanting. The dried finished product still contains only 0.3% $SiO_2$ residual impurity and is obtained in a yield of 52 kg, corresponding to 99% of the theory. The total radiation intensity is reduced from 490 pCi/g in the baddeleyite concentrated used to <10 pCi/g in the zirconium dioxide obtained therefrom. The % $ZrO_2$ data always refers to the sum of $ZrO_2 + HfO_2$.

We claim:

1. A process for the separation of radioactive impurities from ground baddeleyite containing zirconium dioxide and which has been preliminarily purified to a concentrate containing more than 98% by weight of zirconium dioxide plus hafnium dioxide, comprising treating finely ground baddeleyite with an aqueous alkali hydroxide solution at elevated temperatures below the boiling point of said solution for removal of radioactive impurities form the ground baddeleyite and thereafter isolating said zirconium dioxide from said solution.

2. A process as claimed in claim 1 wherein said finely ground baddeleyite has particle sizes of a maximum of 2% by weight greater than 0.06 mm.

3. A process as claimed in claim 1 wherein said treatment is carried out utilizing a 10 to 60% by weight aqueous alkali hydroxide solution 4. A process as claimed in claim 1 wherein said treatment is carried out utilizing a 20 to 50% by weight aqueous sodium hydroxide solution.

5. A process as claimed in claim 3 wherein said treatment is carried out at a temperature of from 80° to 140° C.

6. A process as claimed in claim 4 wherein said treatment is carried out for from 2 to 15 hours.

7. A process of claim 6, wherein said treatment is carried out at 80°–140° C.

8. Process of claim 1, wherein the radioactive impurities are reduced to a total radiation intensity of less than 300 pCi/g.

9. Process of claim 7, wherein the radioactive impurities are reduced to a total radiation intensity of less than 300 pCi/g.

10. A process as claimed in claim 1, wherein said alkali hydroxide is sodium hydroxide.

* * * * *